Dec. 17, 1968  D. G. KEITH  3,417,168
PRODUCTION OF LAMINATES

Filed May 12, 1967  3 Sheets-Sheet 1

Inventor
DONALD GEORGE KEITH

Attorney

Inventor
DONALD GEORGE KEITH

By
Cushman, Darby & Cushman
Attorneys

United States Patent Office 3,417,168
Patented Dec. 17, 1968

3,417,168
PRODUCTION OF LAMINATES
Donald George Keith, Norton-on-Tees, England, assignor to Imperial Chemical Industries Limited, London, England, a corporation of Great Britain
Filed May 12, 1967, Ser. No. 638,147
Claims priority, application Great Britain, May 17, 1966, 21,816/66
13 Claims. (Cl. 264—40)

ABSTRACT OF THE DISCLOSURE

In continuously producing laminates having a foamed plastics or resinous core sandwiched between and bonded to two outer facing materials not necessarily the same, which comprises providing two cooperating substantially parallel conveying surfaces disposed one above the other and forming within supporting platens an extended longitudinal nip, pressure required to hold one platen a fixed distance from the other is measured and fed back to alter the rate of lay-down of the foam-forming mixture and/or the speed of the conveying of the facing material to provide a uniform rate of lay-down of foam-forming mixture per unit area of facing material.

This invention relates to a process and machine for the production of laminates having a foamed plastics or resinous core, for example a foamed polyurethane core, sandwiched between and bonded to two outer facing materials.

Known machines for the continuous manufacture of such laminates consist essentially of a conveyor press system and a foam dispensing unit. The conveyor press system serves to bring the two sheets of facing material into the correct disposition relative to one another and to maintain them in this position while the foam core is formed between them. In practice, the two sheets of facing material are disposed one above the other and at a distance apart equal to the thickness of foam core which is desired in the final laminate. Before the sheets are brought into this disposition, the foam-forming ingredients are applied to at least one of the two sheets, usually to the lower sheet, by means of the foam dispensing unit. The sheets are then brought into the correct disposition by means of the conveyor press system, and formation and setting of the foam occurs, and may be accelerated by the action of heat.

Machines have been described for the continuous manufacture of such laminates, of the type in which the conveyor press system consists of upper and lower conveying surfaces, for example in the form of endless of suitable material, which are backed and supported by fixed platens and are driven in coopertion with each other by suitable means.

Machines of the above mentioned type are subject to the adverse conditions as "underpack" (too little foam in the laminate) and "overpack" (too much foam in the laminate). The former condition, "underpack," may arise, for example, because the rate of lay-down of the foam-forming materials is too low, or because the endless belts are being driven too fast, or for a combination of both these reasons, but in any case the result is poor adhesion of the facing material to the foam core and a finished laminate which is too thin or is imperfectly filled. The latter condition, "overpack," may arise, for example, because the rate of lay-down of the foam-forming materials is too high, or because the endless belts are being driven too slowly, or for a combination of both these reasons, but in any case the result is a bad, weak foam having deformed cells and a finished laminate of unduly high density; in extreme cases "breakback" may occur—that is to say, the foam is extruded backwards from between the endless belts. Once they have arisen, these adverse conditions can be cured, temporarily at least, by adjusting the rate of lay-down of the foaming-forming materials and/or the speed at which the endless belts are being driven, but at present there is no way of telling if and when either of these conditions is about to occur, apart from a rough-and-ready visual inspection of the laminate as it passes through the machine.

In a known improvement on machines of the above-mentioned type, one of the fixed platens, for example the upper platen, is replaced by a number of floating platens which are sprung or positioned by pneumatic cylinders behind the adjacent endless belt. This has the advantage of partially controlling the pressure on the foam, but each change in the foam-forming conditions (e.g., the rate of lay-down of the foam-forming materials and/or the speed at which the endless belts are being driven) alters the thickness of the finished laminate, a proportion of which may be too thick or too thin. This improved machine, furthermore, is not suitable for use with non-compliant endless belts or for non-complaint facing materials.

These drawbacks are overcome by the present invention which provides a process for producing laminates having a foamed plastics or resinous core sandwiched between and bonded to two outer facing materials, which comprises providing two co-operating substantially parallel conveying surfaces forming within supporting platens or the like an extended longitudinal nip, continuously maintaining said platens or the like in substantially constant positions relative to each other by feedback control means, feeding the facing materials one each into contact with the conveying surfaces, supplying to at least one of the facing materials, anterior to the nip, a reactant mixture adapted to form a foam core, coninuously sensing the thrust of the foam against at least one of said platens or the like by coninuously measuring the force required to maintain the platens in said constant positions, controlling the rate of lay-down of the foaming mixture per unit area of facing material so as to maintain said thrust between desired limits, and removing the set foamed laminate from the nip. The feedback control means preferably comprises at least one pneumatic or hydraulic force balance load cell wherein forces are automatically and continuously balanced to maintain the platens in said substantially constant positions relative to each other, and the measurement of the force required for this purpose is obtained in the form of the pneumatic pressure required to maintain the balance.

According to a preferred embodiment of the invention, there is provided a process for continuously producing laminates having a foamed plastics or resinous core sandwiched between and bonded to two outer facing materials not necessarily the same, which comprises providing two co-operating substantially parallel conveying surfaces disposed one above the other and forming within supporting platents an extended longitudinal nip, supporting the upper platen on fluid pressure operated supports the lower ends of which are fixed to, or in relation to the bottom platen, continuously sensing the position of the upper platen with respect to the bottom platen and automatically adjusting the position of said supports by fluid pressure to maintain the upper platen in a substantially constant position relative to the bottom platen, that is to say substantially parallel to, and at a substantially constant distance from the bottom platen, continuously feeding an upper facing material into contact with the top conveying surface and a lower facing material into contact with the bottom conveying surface, supplying to at least one of the facing materials, anterior to the nip, a reactant mixture adapted to form a foam core, continuously sensing the thrust of the foam against the upper platen by continuously measuring the fluid pressure required to maintain the upper platen in its said constant position, controlling the rate of lay-down of the foam-forming mixture per unit area of facing material so as to maintain said thrust between desired limits, and continuously removing the set foamed laminate from the nip.

The upward thrust of the foam against the upper platen is counteracted by the weight of the latter, and the pressure which has to be applied to the fluid pressure operated supports in order to maintain the upper platen level and at a constant height above the lower platen is, therefore, a measure of the upthrust of the foam. If this pressure is substantially constant, the machine will produce a uniformly foamed and filled product. If, however, the pressure required is lower than normal, this means that the upthrust of the foam is excessive, a weak foam with distorted cells is produced and "breakback" is liable to occur; if, on the other hand, the pressure required is greater than normal, this means that the upthrust of the foam is insufficient and the product is liable to issue from the machine incompletely filled and with bad adhesion of the facing material to the core. In either case, the condition is avoided or cured by adjusting the rate of lay-down per unit area of facing material of the foam-forming reactant mixture (e.g., by adjusting the speed of the conveying surfaces and/or the rate of lay-down of the foam-forming reactant mixture).

The process of the invention thus provides, also, a method of controlling the quality of the foamed layer. In general, the lower the pressure on the foam, the better its physical properties. In the case of polyurethane foam, for example, if the average upthrust of the foam on the upper platen is greater than about 0.5 lb./sq. in., the quality of the foam is disturbed in that the cells are deformed, and this has an adverse effect on the compressive strength of the laminate, increases its density, and diminishes its thermal insulation properties. In the known machines, the average upthrust of the foam on the upper platen is frequently above this figure, and for this reason, the product is not satisfactory. By the present invention, however, the measurement of the pressure applied to the fluid pressure operated supports enables selection and adjustment of the speed of the conveying surfaces and/or the rate of lay-down of the polyurethane reactant mixture to values which will maintain the average pressure of the foam on the upper platen at any desired level, for example at below 0.5 lb./sq. in., say at about 0.2 to 0.3 lb./sq. in.

The invention further provides a machine for the continuous manufacture of laminates having a foamed plastics or resinous core sandwiched between and bonded to two outer facing materials not necessarily the same, comprising two-co-operating substantially parallel conveying surfaces disposed one above the other and forming within supporting platens an extended longitudinal nip, means for driving the conveying surfaces in co-operation with each other, means for continuously feeding an upper facing material into contact with the upper conveying surface and a lower facing material into contact with the lower conveying surface, foam dispensing means adapted to supply to at least one of the facing materials, anterior to the nip, a reactant mixture adapted to form a foam core, a plurality of fluid pressure operated supports for the upper platen, the lower ends of said supports being fixed to, or in relation to, the bottom platen, means for continuously sensing the position of the upper platen with respect to the bottom platen and the thrust of the foam against the upper platen, and fluid pressure means responsive to said sensing means for adjusting the position of said supports so as to maintain the platens substantially parallel and the distance between them substantially constant. In a preferred embodiment, there may also be provided means responsive to said sensing means for controlling the speed of the conveying surfaces and/or the rate of lay-down of the reactant mixture on the facing material.

One embodiment of a suitable machine for carrying out the process of the invention is illustrated in the drawings accompanying the provisional specification, wherein.

Figure 1:
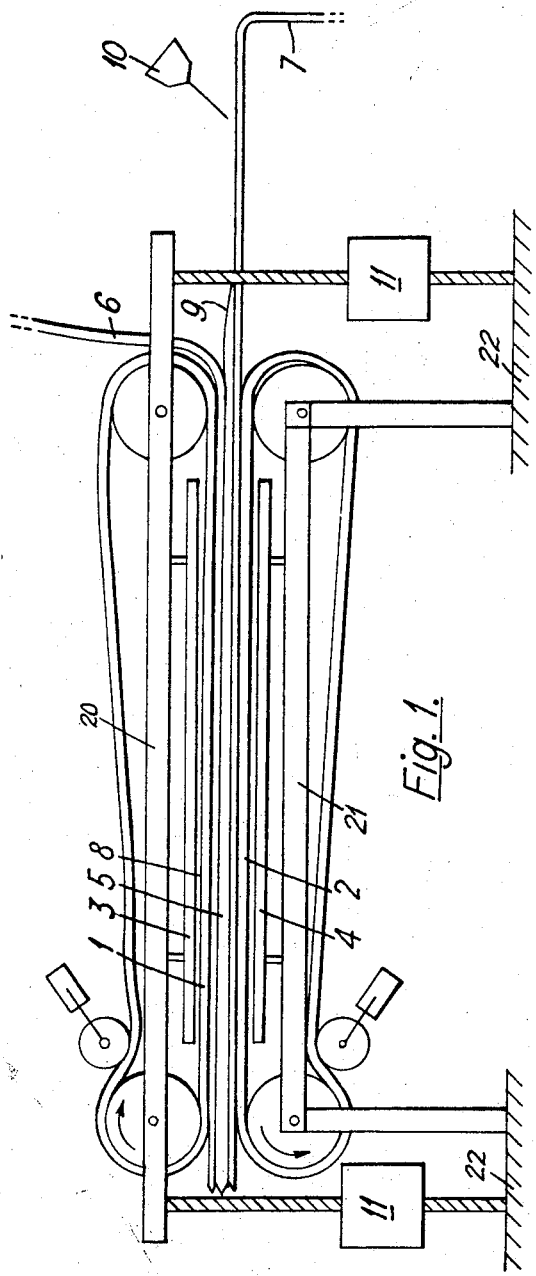
FIG. 1 is a diagrammatic representation of a known machine, but with the upper platen supported on, or in relation to, the lower platen, in accordance with the present invention, by means of fluid pressure operated supports.

Upper and lower conveying surfaces 1, 2, each comprising, for example, an endless conveyor belt, and supported by upper and lower platens 3, 4 respectively, are arranged to form an extended longitudinal nip 5 therebetween. Upper facing material 6 is fed into contact with the upper conveying surface 1, and lower facing material 7 is fed onto a dispensing platform 8 where a reactant mixture of polyurethan adapted to form a foam core 9 is applied to the lower facing material 7 by a mixing device 10. Heat is preferably supplied to the underside of the dispensing platform 8, for example by means of radiant heat elements (not illustrated). From the dispensing platform 8, the lower facing material 7 is fed into contact with the lower conveying surface 2. There is thus fed into and through the longitudinal nip 5 a laminate comprising upper and lower facing material 6, 7 with a foaming core of polyurethàn 9 sandwiched therebetween. Heat may be supplied to the upper and lower conveying surfaces 6, 7 by suitable heaters (not illustrated).

Figure 2:
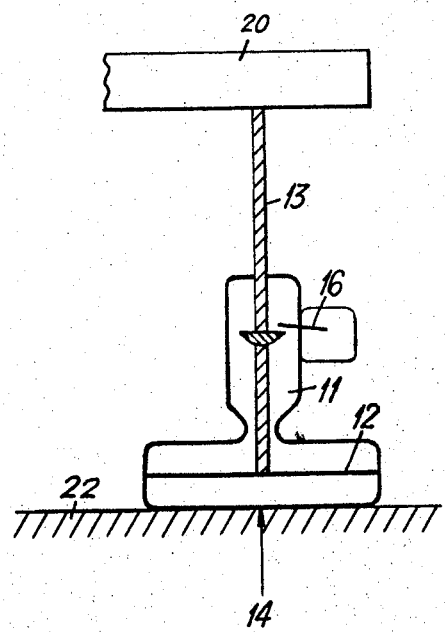
FIG. 2 is a diagrammatic view of one of said fluid pressure operated supports.
Figure 3:
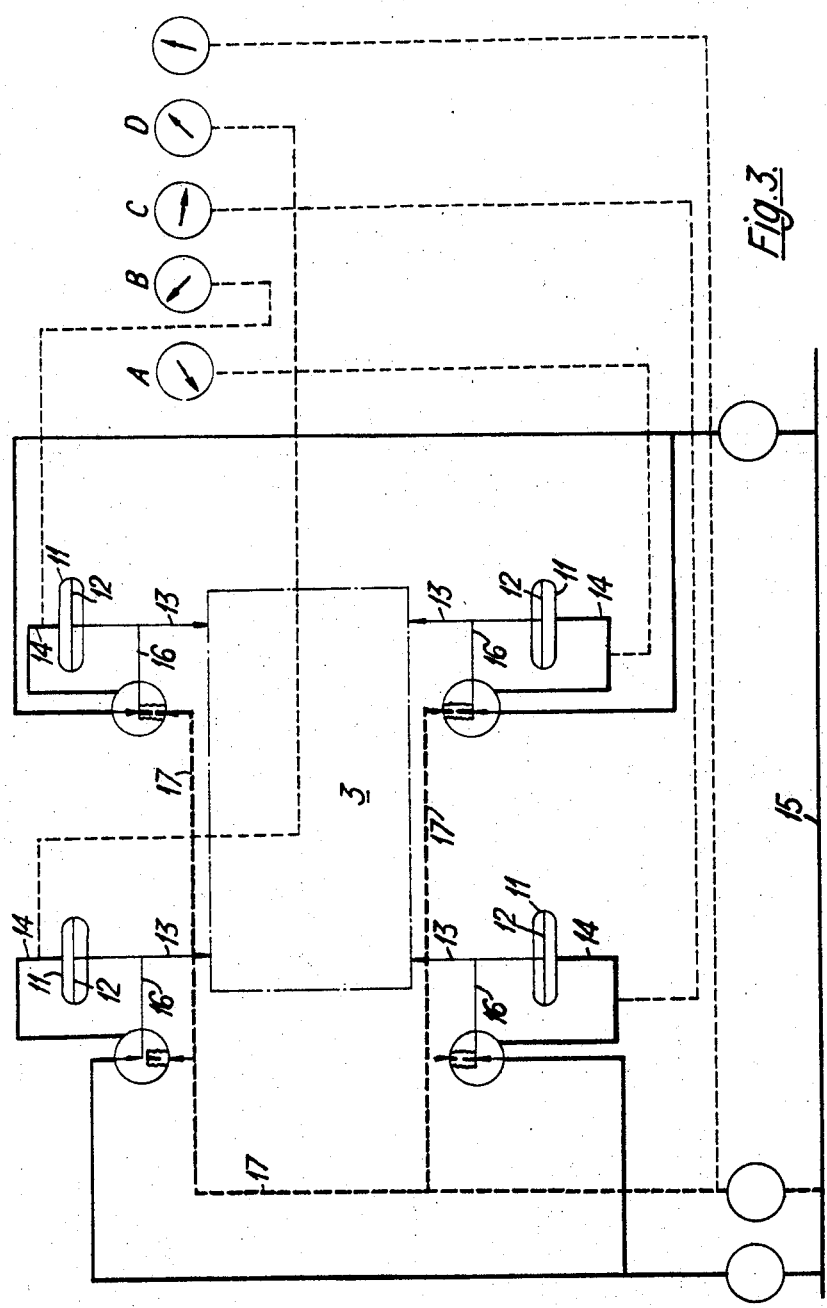
FIG. 3 is a line diagram illustrating the supply of fluid to the fluid pressure operated supports.

The upper platen 3 is supported, for instance via a frame 20, by means of a number of fluid pressure operated supports 11 (for example by four such supports) which are shown conveniently in FIG. 1, and in greater detail in FIGS. 2 and 3. The supports 11 may, for example, be Fisher valve actuators from which the springs have been removed. Each of the valve actuators is secured, at or near its bottom, to or in relation to the lower platen 4 for instance by being secured on the same stationary support 22 on which the lower platen 4 is fixed for instance via a frame 21. Each of the valve actuators encloses a diaphragm or piston 12. On its upper face, the diaphragm or piston 12 is provided with a push rod 13 which abuts and supports the upper platen 3, and on the opposite side of the diaphragm or piston there is a connection 14 to a main source 15 of actuating compressed air; each of the valve actuators is also provided with a suitable air pressure gauge A, B, C, D.

The weight of the upper plate 3 is counterbalanced partly by the upthrust of the foam and partly by the upthrust on the under faces of the diaphragms or pistons 12 of the compressed air, and the latter is regulated to maintain the upper platen 3 parallel to and at a constant distance from the lower plate 4. The pressure gauges indicate whether an abnormally high air pressure is required to maintain the platens in position (in which case the upthrust of the foam is abnormally low), or whether the platens can be maintained in position using an abnormally low air pressure (in which case the upthrust of the foam is abnormally high), and in either case steps can be taken to remedy the condition by altering the rate of lay-down of the reactant mixture and/or the speed of the endless belts 1, 2.

The pressure gauges, moreover, can be used to masure the average foam pressure on the upper platen. The apparent weight of the upper platen will be equal to the actual weight W of the upper platen *minus* the upthrust of the foam. If the effective area of each diaphragm is Y sq. in., then the apparent weight of the upper platen is $$Y(P_A + P_B + P_C + P_D)$$

where $P_A$, $P_B$, $P_C$ and $P_D$ are the pressures (indicated by the pressure gauges) of the air to the four valve actuator diaphragms.

The upthrust of the foam is therefore:

$$W - Y(P_A + P_B + P_C + P_D)$$

and the average foam pressure on the upper platen is $$\frac{W - Y(P_A + P_B + P_C + P_D)}{A}$$

where A is the area of the upper platen in sq. in. As mentioned above, the average foam pressure on the upper platen is preferably maintained below about 0.5 lb./sq. in. for example 0.2 to 0.3 lb./sq. in. Instead of measuring the average upthrust of the foam, the upthrust at selected positions can be measured by taking readings from any selected pressure gauge or gauges.

In order to maintain the upper platen accurately in position with respect to the lower platen, each of the valve actuators 11 is provided with an accurate positioner 16 which continually senses the position of the push rod 13. If the rod is too high, the positioner operates so as partially to cut off the supply of compressed air to the diaphragm 12 till the rod sinks to its normal position; on the other hand, if the rod is too low, the positioner operates so as to release a supply of further, position-setting compressed air 17 to the diaphragm, from the main 15, until the rod rises to its normal position. The positioner 16 is sufficiently sensitive to detect, and to operate upon, variations of only 0.001″ in the position of the push rod 13, and therefore assists in producing laminates of a high degree of accuracy, the thickness of which hardly varies at all. The invention is particularly useful in the production of edged laminates where thickness variation is totally forbidden.

The invention is also useful for use with machines in which the conveying surfaces are non-compliant surfaces and in the manufacture of laminates in which the facing materials are non-compliant. Its main advantage, however, resides in the fact that it produces fully-filled low-density laminates containing good foam with undistorted cells, arising from the fact that the foam pressure is continuously measured and can therefore be controlled by adjustment of the rate of lay-down of the foam-foaming mixture per unit area of facing material.

I claim:

1. A process for producing laminates having a foamed core sandwiched between and bonded to two outer facing materials, which comprises providing a pair of substantially parallel supporting platens, and two cooperating substantially parallel conveying surfaces forming between said supporting platens an extended longitudinal nip, continuously maintaing said platens in substantially constant positions relative to each other by feedback control means, feeding the facing materials one each into contact with the conveying surfaces, supplying to at least one of the facing materials, anterior to the nip, a reactant mixture adapted to form a foam core, continuously sensing the thrust of the foam against at least one of said platens by continuously measuring the force required to maintain the platens in said constant positions, controlling the rate of lay-down of the foam-forming mixture per unit area of facing material so as to maintain said thrust between desired limits, and removing the set foamed laminate from the nip.

2. A process as claimed in claim 1, wherein said core is foamed polyurethane.

3. A process as claimed in claim 1, wherein said conveying surfaces are endless belts.

4. A process for continuously producing laminates having a foamed core sandwiched between and bonded to two outer facing materials not necessarily the same, which comprises providing a pair of substantially parallel supporting platens, and two cooperating substantially parallel conveying surfaces disposed one above the other and forming between said supporting platens an extended longitudinal nip, supporting the upper platen on fluid pressure operated supports the lower ends of which are fixed in relation to the bottom platen, continuously sensing the position of the upper platen with respect to the bottom platen and automatically adjusting the position of said supports by fluid pressure to maintain the upper platen substantially parallel to, and at a substantially constant distance from, the bottom platen, continuously feeding an upper facing material into contact with the top conveying surface and a lower facing material into contact with the bottom conveying surface, supplying to at least one of the facing materials, anterior to the nip, a reactant mixture adapted to form a foam core, continuously sensing the thrust of the foam against the upper platen by continuously measuring the fluid pressure required to maintain the upper platen in its said constant position, controlling the rate of lay-down of the foam-forming mixture per unit area of facing material so as to maintain said thrust between desired limits, and continuously removing the set foamed laminate from the nip.

5. A process as claimed in claim 4, wherein said fluid is compressed air.

6. A machine for the continuous manufacture of laminates having a foamed core sandwiched between and bonded to two outer facing materials not necessarily the same, a pair of substantially parallel supporting platens, two cooperating substantially parallel conveying surfaces disposed one above the other and forming said supporting platens an extended longitudinal nip, means for driving the conveying surfaces in co-operation with each other, means for continuously feeding an upper facing material into contact with the upper conveying surface and a lower facing material, into contact with the lower conveying surface, foam dispensing means adapted to supply to at least one of the facing materials, anterior to the nip, a plurality of fluid pressure operated supports for the upper platen, the lower ends of said supports being fixed in relation to the bottom platen, means for continuously sensing the position of the upper platen with respect to the bottom platen and the thrust of the foam against the upper platen, and fluid pressure means responsive to said sensing means for adjusting the position of said supports so as to maintain the platens substantially parallel and the distance between them substantially constant.

7. A machine as claimed in claim 6, including means responsive to said sensing means for controlling the rate of lay-down of the reactant mixture on the facing material.

8. A machine as claimed in claim 6, including means responsive to said sensing means for controlling the speed of the conveying surfaces.

9. A machine as claimed in claim 6, wherein each of said fluid pressure operated supports comprising a piston-and-cylinder device fixed in relation to the bottom platen, a substantially vertically disposed push-rod adapted to support the upper platen is provided on the upper face of the piston, and the lower portion of the cylinder below the piston is connected to a source of fluid pressure.

10. A machine as claimed in claim 6, including a fluid pressure gauge for each of said fluid pressure operated supports.

11. A machine as claimed in claim 6, wherein said fluid is compressed air.

12. A machine as claimed in claim 6, wherein said conveying surfaces are endless belts.

13. A machine as claimed in claim 9, including a positioner for each of said fluid pressure operated supports, said positioner being adapted continuously to sense the position of said push-rod and, responsive to changes in said position, to control the fluid pressure.

References Cited

UNITED STATES PATENTS

| | | | |
|---|---|---|---|
| 2,135,763 | 11/1938 | Nicholson | 100—154 |
| 2,841,205 | 7/1958 | Bird | 154—37 |

JULIUS FROME, *Primary Examiner.*

L. M. GARRETT, *Assistant Examiner.*

U.S. Cl. X.R.

156—103; 100—154; 264—45, 47